United States Patent [19]

Kobayashi

[11] Patent Number: 5,200,883

[45] Date of Patent: Apr. 6, 1993

[54] PORTABLE COMPUTER HAVING AN EXTERNAL BATTERY MOUNTING PORTION AND OPTIONAL DEVICE MOUNTING PORTION

[75] Inventor: Takaichi Kobayashi, Itsukaichi, Japan

[73] Assignee: Kabushiki Kaisha Toshiba, Kawasaki, Japan

[21] Appl. No.: 899,135

[22] Filed: Jun. 16, 1992

Related U.S. Application Data

[63] Continuation of Ser. No. 542,041, Jun. 22, 1990, abandoned.

[30] Foreign Application Priority Data

Jun. 23, 1989 [JP] Japan .................................. 1-162216
Jun. 23, 1989 [JP] Japan .................................. 1-162219
Jun. 23, 1989 [JP] Japan .................................. 1-162221

[51] Int. Cl.⁵ .......................... H05K 7/12; E05C 3/14; G06F 1/16
[52] U.S. Cl. .................................. 361/395; 361/380; 292/228; 220/346
[58] Field of Search ........................ 429/96, 97, 98, 99, 429/100; 292/226, 228, DIG. 31, DIG. 38; 206/1.5; 361/380, 391, 392, 393, 394, 395, 399, 412, 415, 429; 220/324, 326, 329, 346; 364/708

[56] References Cited

U.S. PATENT DOCUMENTS

| | | | |
|---|---|---|---|
| 3,709,538 | 1/1973 | Seitz et al. | 292/DIG. 31 X |
| 4,191,917 | 3/1980 | Brown et al. | 429/97 X |
| 4,392,503 | 7/1983 | Watanabe | 206/1.5 X |
| 4,571,456 | 2/1986 | Paulsen et al. | . |
| 4,680,674 | 7/1987 | Moore | 361/395 |
| 4,742,478 | 5/1988 | Nigro, Jr. et al. | . |
| 4,903,222 | 2/1990 | Carter et al. | 364/708 |
| 4,942,356 | 7/1990 | Ellingen et al. | 361/392 X |
| 5,015,546 | 5/1991 | Dulaney et al. | 429/99 |

FOREIGN PATENT DOCUMENTS

| | | | |
|---|---|---|---|
| 0254889 | 2/1988 | European Pat. Off. | . |
| 1128896 | 5/1962 | Fed. Rep. of Germany | 429/98 |
| 2085219 | 4/1982 | United Kingdom | 429/123 |
| 2128783 | 5/1984 | United Kingdom | . |

OTHER PUBLICATIONS

Toshiba T1600 Portable Personal Computer User's Manual (Sep. 1988), pp. i, 2-1 to 2-7, 4-20 to 4-25.
Published Unexamined Japanese Utility Model Application No. 64-54369 (Japanese language, no translation available), Apr., 1989.

Primary Examiner—Leo P. Picard
Assistant Examiner—Michael W. Phillips
Attorney, Agent, or Firm—Cushman, Darby & Cushman

[57] ABSTRACT

A compact electronic apparatus includes a housing substantially in the form of a rectangular prism. The top face of the housing includes a substantially rectangular front half portion on which a keyboard unit is mounted and a substantially rectangular rear half portion continuous with the rear face. The housing includes a pair of receiving recess openings to the rear half portion of the top surface and the rear surface. A battery pack and an optional component each having substantially the same shape as their respective recess, are each removably fitted in their receiving recess. The battery pack and optional component each have an outer surface which is exposed to the outside and constitutes part of the rear face of the housing and part of the rear half portion of the top face when the battery pack optional component are fitted in their respective receiving recess.

15 Claims, 9 Drawing Sheets

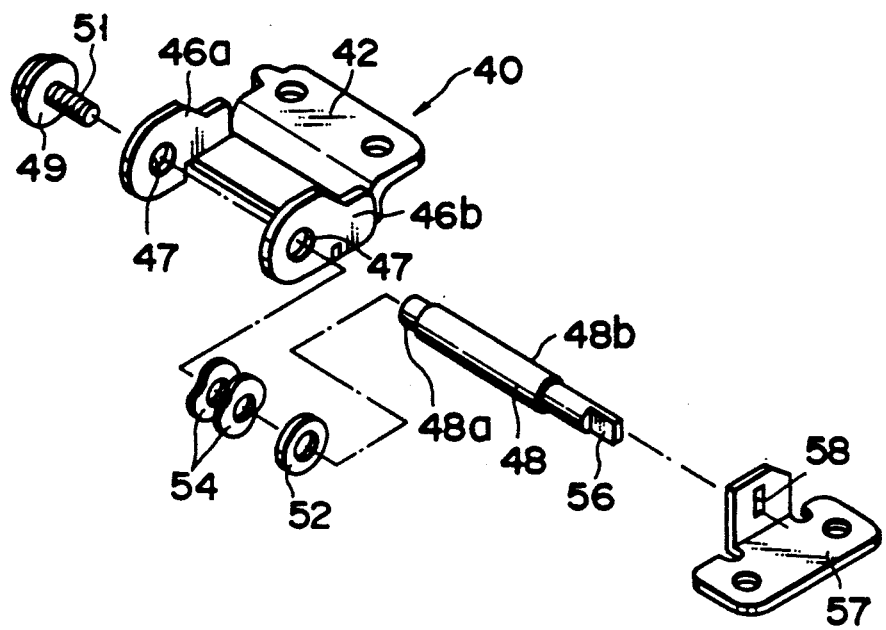
F I G. 6
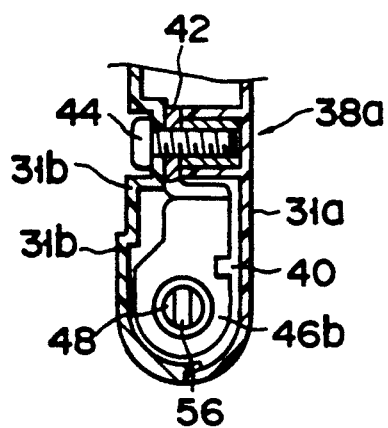
F I G. 7

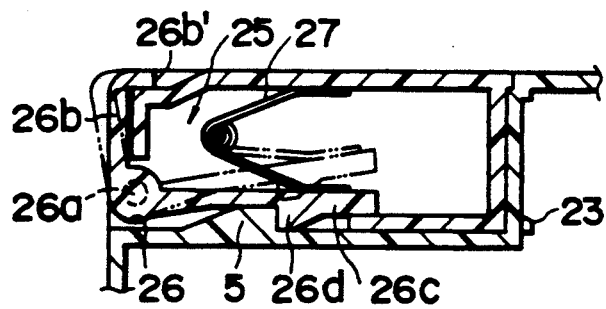
F I G. 11
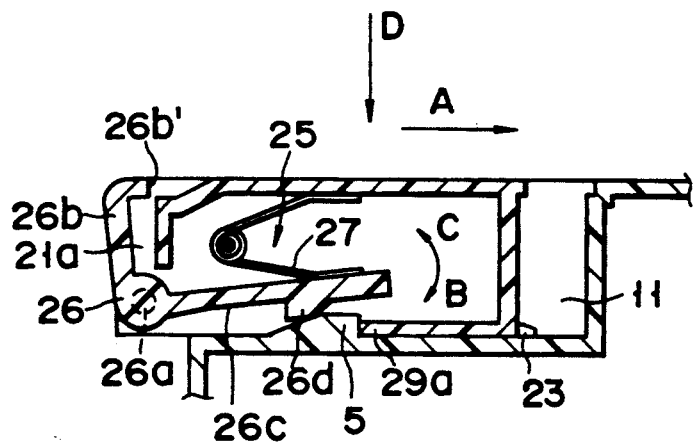
F I G. 12
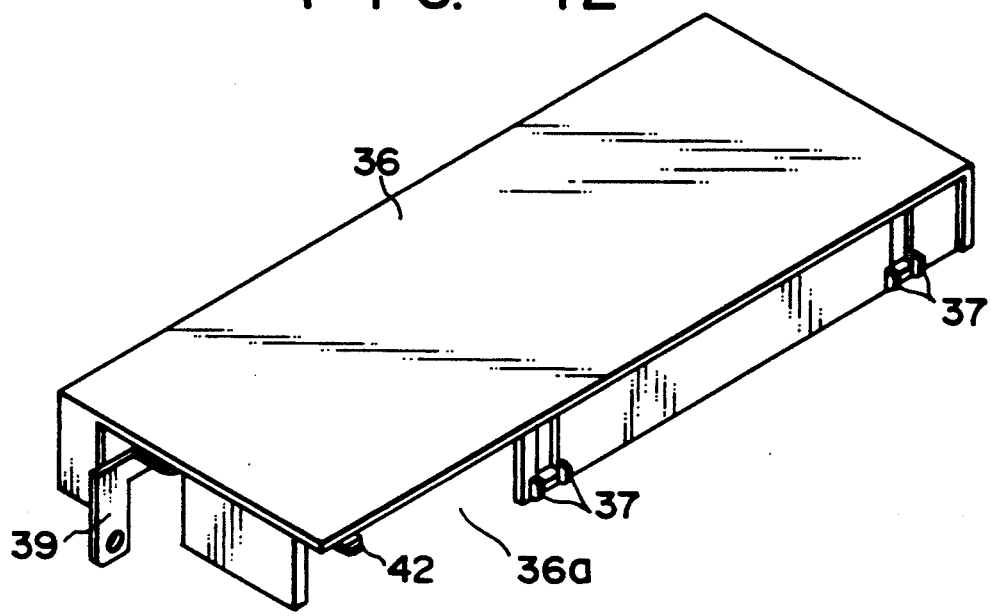
F I G. 13

PORTABLE COMPUTER HAVING AN EXTERNAL BATTERY MOUNTING PORTION AND OPTIONAL DEVICE MOUNTING PORTION

This is a continuation of application No. 07/542,041, filed on Jun. 22, 1990, now abandoned.

BACKGROUND OF THE INVENTION

1. Field of the Invention

The present invention relates to a compact electronic apparatus, such as a laptop personal computer, word processor, etc.

2. Description of the Related Art

Conventionally provided are various portable compact electronic apparatuses in which a keyboard is disposed at the front portion of a housing having a substantially rectangular plane configuration. A display unit, containing a flat panel display therein, is rotatably mounted between the keyboard and the rear portion of the housing, so that the keyboard is covered by the display unit when it is shut down.

The electronic apparatuses of this type are low-profiled for improved portability, and are mounted with a battery pack for use as a driving power source. If necessary, these apparatuses can be additionally furnished with an optional component, e.g., an interface component for communication.

The battery pack is removably attached to the housing of the electronic apparatuses. Conventionally, a receiving space for the battery pack is formed inside the rear or lateral portion of the housing and has a loading slot opening to the rear or lateral face of the housing. The whole battery pack can be removably loaded into the receiving space through the loading slot. Also, a receiving space for the optional component is previously defined inside the housing The optional receiving space has a loading slot which opens to the rear or lateral face of the housing, and is normally closed by a lid.

Thus, in the conventional compact electronic apparatuses, the receiving space for the additionally installed optional component, as well as the space for the whole battery pack, are provided inside the housing. Accordingly, the housing requires partition walls for defining these receiving spaces, especially the top and bottom of each space. Since the whole battery pack is housed in the receiving space, it cannot be easily removed from the space.

SUMMARY OF THE INVENTION

The present invention has been contrived in consideration of these circumstances, and its object is to provide a compact electronic apparatus permitting an additional reduction in thickness and having high operating efficiency.

A compact electronic apparatus according to the present invention comprises: a housing substantially in the form of a rectangular prism, having a rear face and a top face substantially rectangular in plane configuration, the top face including a substantially rectangular front half portion and a substantially rectangular rear half portion continuous with the rear face; a keyboard unit arranged at the front half portion of the top face; and a display unit mounted on the housing so as to be rotatable between a closed position, where the keyboard is by the display unit and an open position where the keyboard is exposed The housing has a receiving recess opening to the rear half portion of the top face and the rear face. An optional component having substantially the same shape as the receiving recess is removably fitted to the receiving recess. The optional component has an outer surface which constitutes part of the rear face of the housing and part of the rear half portion of the top face when in the fitted state.

In the present invention, the receiving portion for the optional component is located at the rear portion of the housing and is formed as a receiving recess in the top and rear faces of the housing. Further, the outer surface of the optional component fitted in the receiving recess constitutes part of the top and rear faces of the housing. Thus, the housing need not be provided with any partition wall for concealing the upper surface of the optional component.

The optional component can be fitted into or removed from the receiving recess by moving the component parallel to the top face of the housing. Thus, an operator can remove the optional component, attached to the rear portion of the housing so that its outer surface or its top and rear faces, in particular, are exposed to the top and rear faces of the housing, respectively, from the housing with his or her hand on the top and rear faces of the optional component. In mounting the optional component in the receiving recess, moreover, the operator can push it forward with his or her hand on the top and rear faces of the component.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIGS. 1 to 19 show a laptop personal computer according to an embodiment of the present invention, in which:

FIG. 1 is a perspective view of the computer with its display unit open;

FIG. 2 is a rear perspective view of the computer with the display unit closed;

FIG. 3 is a rear view of the computer;

FIG. 4 is a side view of the computer;

FIG. 5 is a sectional view showing hinges;

FIG. 6 is an exploded perspective view of one of the hinges;

FIG. 7 is a sectional view taken along line VII—VII of FIG. 5;

FIG. 8 is an exploded perspective view showing the rear portion of the computer;

FIG. 9 is a bottom view of a battery pack;

FIG. 10 is a sectional view taken along line X—X of FIG. 9;

FIG. 11 is a sectional view showing a state in which the battery pack is fitted in a receiving recess of a housing;

FIG. 12 is a sectional view showing a state in which the battery pack is in process of being fitted in the receiving recess of the housing;

FIG. 13 is a perspective view of an optional cover;

FIG. 14 is a side view of the computer with its tilting mechanism in a housed state;

FIG. 15 is a side view of the computer with its tilting mechanism in a raised state;

FIG. 16 is a perspective view showing the stand and a slider;

FIG. 17 is a sectional view schematically showing a stand holder portion;

FIG. 18 is a sectional view of a tilting mechanism with the stand in the housed state; and FIG. 19 is a sectional view of the tilting mechanism with the stand in the raised state.

DETAILED DESCRIPTION OF THE PREFERRED EMBODIMENT

Figure 1:
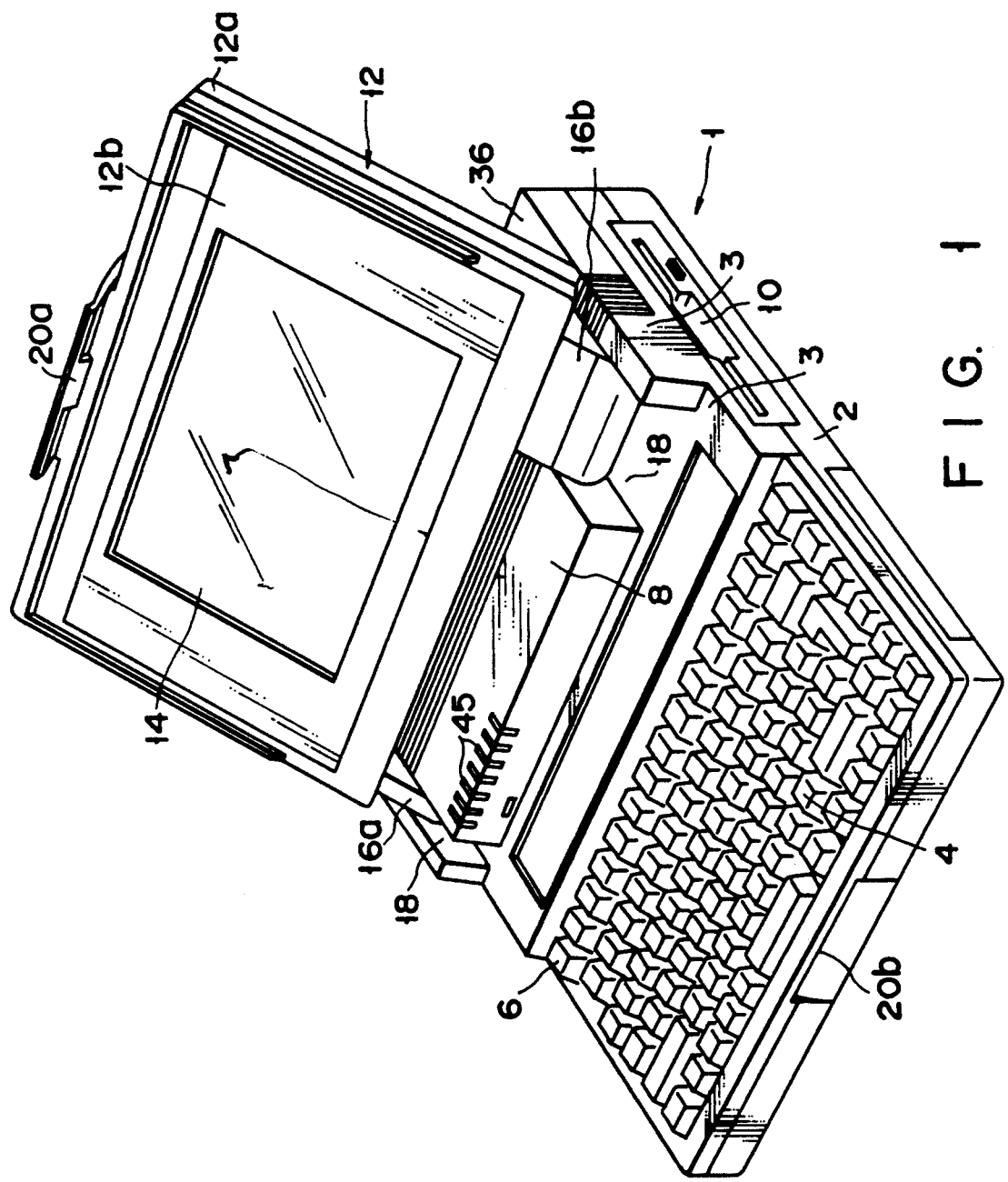

A laptop personal computer according to an embodiment of the present invention will now be described with reference to the accompanying drawings.

As shown in FIGS. 1 to 4, the personal computer comprises a plastic housing 1 having a substantially rectangular plane configuration. The housing 1 includes base portion 2, which has a substantially rectangular bottom wall and a peripheral wall protruding therefrom and extending along the peripheral edge of the bottom wall, and a cover portion 3 covering the rear half of the top face of the base portion. A keyboard unit 4 is mounted on the front half of the base portion 2. The top face of the housing 1 has a stepped form, including front and rear half portions 6 and 8. The front half portion 6, which includes the keyboard unit 4, is situated at the front half portion of the housing. The rear half portion 8 is situated at the rear half portion of the housing and on a higher level than the front half portion 6.

The housing 1 contains therein a printed board (not shown) mounted with electronic components, a printed board (not shown) for indicators 45, a floppy disk drive unit 10, etc.

As shown in FIGS. 1 to 4, a display unit 12 is rotatably mounted on the cover portion 3 of the housing 1. The unit 12 includes a flat panel display 14, such as a liquid crystal display, an outer cover 12a enclosing the back of the display 14, and an inner cover 12b having a display window. Further, the unit 12 has a pair of legs 16a and 16b, which are inserted in their corresponding recesses 18 in the upper surface of the cover portion 3, and are rotatably supported by means of hinges mentioned later. Thus, the display unit 12 can rotate between an open position shown in FIG. 1, where it allows an operator to operate the keyboard 4 while observing the display 14, and a closed position shown in FIG. 2, where it conceals the keyboard 4. The display unit 12 is designed so that the upper surface of the outer cover 12a is continuous and flush with that of the cover portion 3 of the housing 1 and the rear half portion 8 when in the closed position.

The display unit 12 can be kept at the closed position by engaging its elastic hook 20a with a retaining groove 20b in the front end face of the housing 1. Further, the unit 12 can be kept fixed at any desired opening angle by hinges (mentioned later) for connection with the cover portion 3. Lead wires for connecting the display unit 12 and the printed boards in the housing 1 are passed through the legs 16a and 16b of the unit 12.

Figure 2:
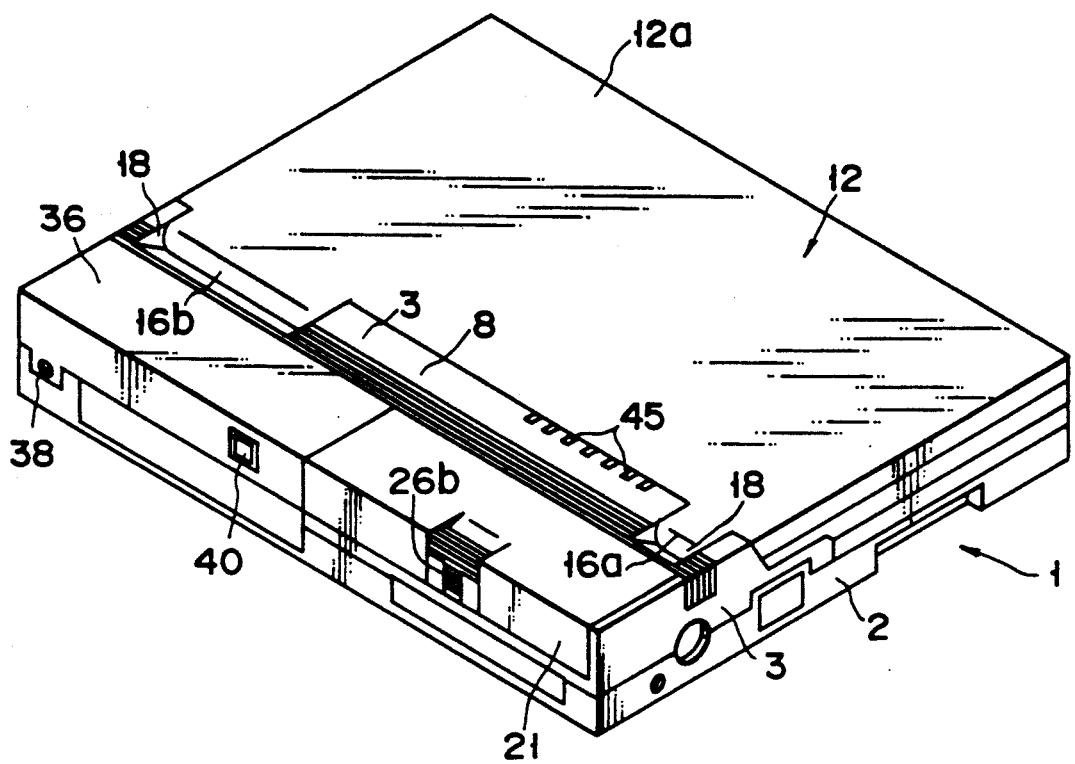

In FIGS. 1 and 2, numeral 45 denotes an indicators 45 which are viewable without regard to the state, open or closed, of the unit 12.

Figure 5:
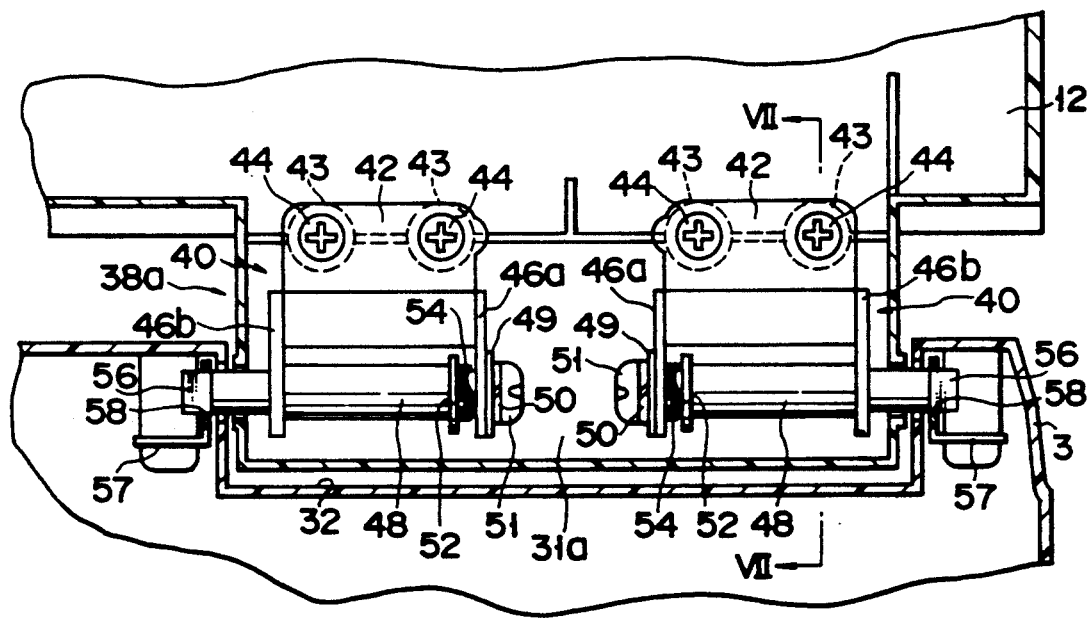

As shown in FIGS. 5 to 7, a pair of hinges 40 are incorporated in the leg 16b of the display unit 12. These hinges 40 serve not only to rotatably support the unit 12 but also to keep the unit 12 fixed at any desired opening angle. Since the two hinges 40 have the same construction, only one of them will be described in detail below.

The hinge 40 is provided with a bracket 42, which is fixed to a pair of bosses 43 on the inside of the outer cover 12a by means of screws 44. The bracket 42 has a pair of integral bearing walls 46a and 46b facing each other, and a through hole 47 is bored through each bearing wall. A rotating shaft 48 is rotatably passed through the holes 47. A screw 51 is screwed in one end of the shaft 48 with the aid of a plain washer 49 and a spring washer 50, whereby the shaft 48 is prevented from coming off the bracket 42.

The rotating shaft 48 is a stepped shaft having a small-diameter portion 48a and a large-diameter portion 48b. A plain washer 52 with an outer diameter greater than the large-diameter portion 48b is fitted on the small-diameter portion 48a. A stepped portion between the large- and small-diameter portions 48a and 48b is situated close to the bearing wall 46a, and the washer 52 abuts against this stepped portion. Further, wave washers 54 for use as ring-shaped spring members, e.g., two in number, are mounted on the small-diameter portion 48a so as to be situated between the bearing wall 46a and the plain washer 52. The washers 54 are axially compressed between the wall 46a and the washer 52 by means of the fastening force of the screw 51. Thus, a frictional force is produced between the wall 46a and the washer 52, that is, between the bracket 42 and the rotating shaft 48, by the action of the wave washers 54. This frictional force serves to restrain relative rotation of the bracket 42 and the shaft 48.

The other end portion of the rotating shaft 48 projects into the inside space of the cover portion 3, penetrating the wall of the leg 38a and a wall defining the recess 18. A rectangular stopper portion 56 is formed at the projecting end portion of the shaft 48. The stopper portion 56 is nonrotatably fitted in a rectangular hole 58 of a receiving fitment 57, which is fixed to the inside of the cover portion 3.

When the display unit 12 is rotated from its closed position to a desired open position, the bracket 42, fixed on the display unit side, rotates around the outer peripheral surface of the rotating shaft 48. The two wave washers 54 are interposed compressed between the washer 52 on the shaft 48 and the bearing wall 46a of the bracket 42. Accordingly, the washers 54 are pressed against both the wall 46a and the washer 52 to produce the frictional force between them. This frictional force restrains the bracket 42 and the rotating shaft 48 from rocking relatively to each other, so that the display unit 12 can be kept fixed at the desired open position.

Figure 8:
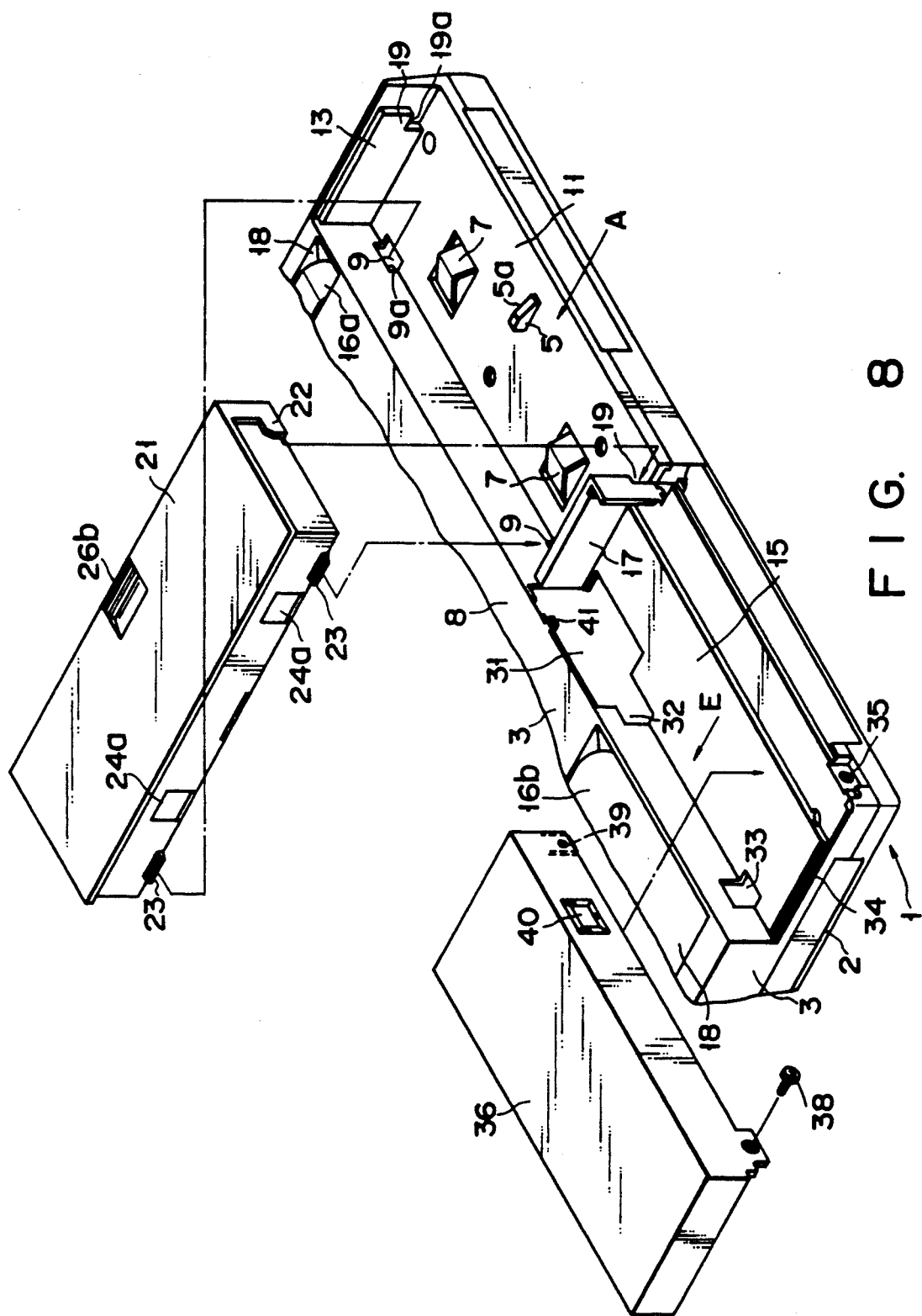

As shown in FIG. 8, a substantially rectangular power source receiving recess 11 and an optional part receiving recess 15, both extending from side to side, are arranged side by side at the back of the recesses 18 of the rear portion of cover portion 3 of the housing 1. The recesses 11 and 15 open to the top face of the rear portion of the housing 1, i.e., the rear half portion 8, and the rear face of the housing. Further, the optional part receiving recess 15 opens to the lateral face of the rear portion of the housing 1, on the opposite side thereof to the power source receiving recess 11.

As shown in FIG. 8, the housing 1 has a pair of parallel wall portions 13 and 17 formed at the rear portion thereof, and the power source receiving recess 11 is defined between these wall portions. The wall portion 17 is situated between the recesses 11 and 15, thereby separating the two. A peripheral retaining portion or projection 19 is formed at the rear end portion of each of the wall portions 13 and 17. The respective retaining portions 19 of the wall portions 13 and 17 face each other. Each retaining portion 19 has a retaining surface 19a at a predetermined distance from the upper surface of the bottom wall of the power source receiving recess 11. Also, a pair of peripheral retaining portions 9 are formed at the corner between a front end wall and the bottom wall defining the recess 11. Each retaining portion 9, which is formed of a through hole, has a retaining surface 9a (upper side edge) spaced from the upper surface of the bottom wall of the recess 11.

A pair of terminal fitments 7 project into the power source receiving recess 11 through the bottom wall thereof. A detent projection 5 protrudes integrally from the upper surface of the bottom wall of the recess 11 so as to be situated between the fitments 7. The projection 5 has a slanting surface 5a which ascends forward from the rear end of the housing 1. The terminal fitments 7, which can be elastically deformed, is connected electrically with a battery pack 21 described below.

Figure 3:
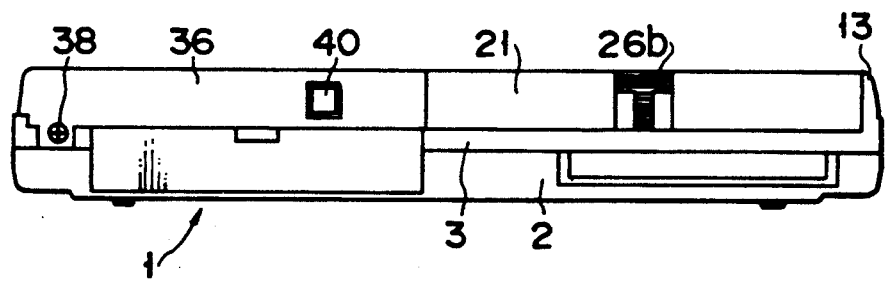
Figure 4:
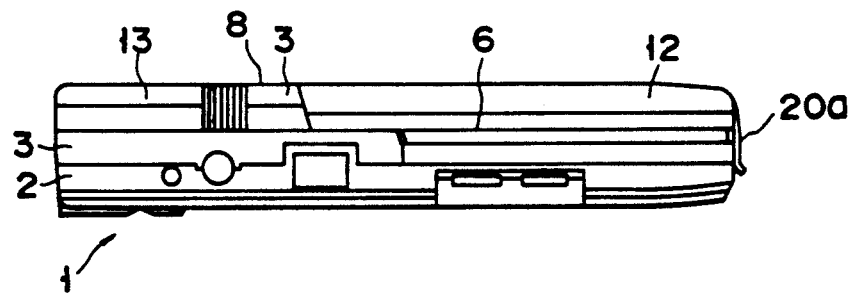

The battery pack 21, which is of a rechargeable type, serves as a power source for the personal computer. The pack 21 is fitted in the power source receiving recess 11 so that it can be removed from the back thereof. In the fitted state, the top and rear faces of the battery pack 21 are exposed, as shown in FIGS. 2 to 4, thus constituting part of an outer rear face of the housing 1. The top and rear faces of the battery pack 21, in particular, are situated flush with the rear half portion 8 of the top face of the housing 1 and the rear face thereof, respectively. The top face of the pack 21 is also flush with the top face of the display unit 12 in the closed state.

Figure 9:
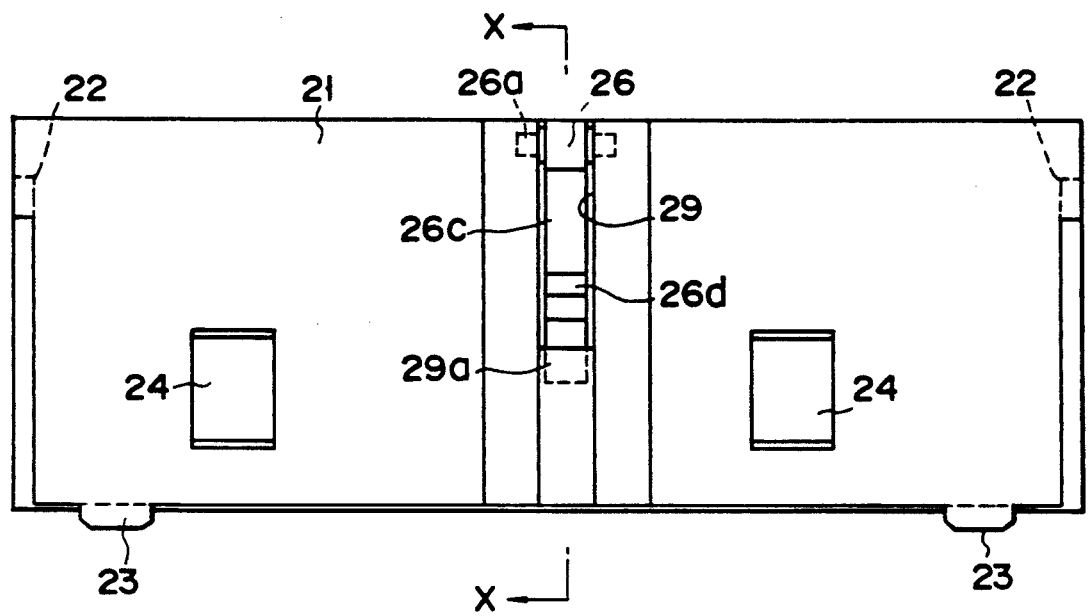

The battery pack 21 has the form of a rectangular prism, as shown in FIGS. 8 and 9. A retaining projection 22 is formed integrally on each lateral face of the pack 21 so that it can releasably engage its corresponding peripheral retaining portion 19. Also, a pair of retaining projections 23 protrude integrally from the front face of the battery pack 21 so that they can releasably engage their corresponding retaining portions 9. Furthermore, a pair of terminal strips 24, which can in contact with the terminal fitments 7, are exposed from the lower surface of the battery pack 21.

When the battery pack 21 is inserted into the power source receiving recess 11 from the back of the housing 1, in the direction of arrow A of FIG. 8, the retaining projections 23 engage with their corresponding retaining portions 9, while the retaining projections 22 engage with their corresponding retaining portions 19. As a result, the terminal fitments 7 come elastically into contact with their corresponding terminal strips 24 of the battery pack 21, thereby urging the pack 21 upward. Thus, the battery pack 21 is mounted in the power source receiving recess 11 in a manner such that it is restrained from moving from side to side by the wall portions 13 and 17, and from moving upward by the aforesaid engaging structures.

Figure 10:
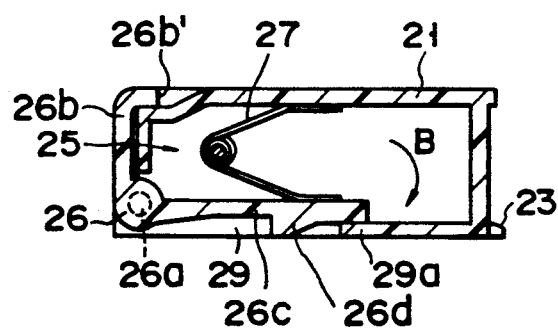

The battery pack 21 has a fixing mechanism 25 in its central portion, whereby it is kept mounted in the power source receiving recess 11. As shown in FIGS. 9 and 10 the mechanism 25 includes a bell crank 26 rotatably attached to the battery pack 21 and a torsion spring 27 for urging the crank 26.

The bell crank 26 is substantially L-shaped in lateral configuration, and its bent portion is supported on the battery pack 21 by means of a pivot 26a so that the crank 26 is rockable around the pivot. One arm portion of the crank 26 extends along that portion of the battery pack 21 which is exposed when the pack 21 is mounted in the recess 11, that is, from the rear face of the pack 21 to the rear end portion of the top face thereof, thus constituting an operating section 26b. As shown in FIG. 2, the operating section 26b is substantially T-shaped as viewed from the back of the battery pack 21, and has corrugations on the outer surface thereof to prevent slipping and thus to enable a user to grip the operating section 26b more firmly. A hollow 21a (see FIG. 12) is formed covering the rear face and the rear end portion of the top face of the battery pack 21. Normally, the operating section 26b engages the hollow 21a so as to be flush with the outer surface of the rear portion of the pack 21. As shown in FIG. 10, a distal end face 26b' of the operating section 26b is exposed so that an operator's finger can easily grasp section 26b.

The other arm portion of the bell crank 26 extends substantially at right angles to the operating section 26b and substantially parallel to the bottom surface of the battery pack 21, from the bent portion, thus constituting a retaining arm section 26c. A retaining pawl 26d protrudes integrally from the lower surface of the arm section 26c. It can engage the detent projection 5 in the power source receiving recess 1. The bottom wall of the battery pack 21 is formed with an elongate open portion 29 which extends forward from the rear end of the bottom wall. The whole arm section 26c except its extending end portion is exposed to the outside through the open portion 29. The extending end of the arm section 26c can engage an edge portion 29a of the bottom wall of the battery pack 21 which defines the front edge of the open portion 29.

The torsion spring 27 is disposed inside the battery pack 21. One arm portion of the spring 27 abuts against the ceiling surface of the pack 21, while the other arm portion of the spring abuts against the upper surface of the retaining arm section 26c, thereby urging the bell crank 26 to rock in the direction of arrow B around the pivot 26a. Meanwhile, the extending end portion of the arm section 26c is pressed against the edge portion 29a of the battery pack 21, whereby the crank 26 is restrained from rocking in the direction of arrow B. Thus, the bell crank 26 is normally kept in the state shown in FIG. 10.

As shown in FIG. 8, moreover, a pair of openings 24a are formed in the front end wall of the battery pack 21, and part of the each terminal strip 24 is exposed through its corresponding opening 24a. Thus, the battery pack 21 can be applied to a case where the terminal fitments are provided on that wall portion of the housing 1 which defines the front face of the power source receiving recess 11.

In mounting the battery pack 21 in the power source receiving recess 11 of the housing 1, the operator seizes the pack 21 with his or her fingers on the top and rear faces of the pack, and then insert it in the direction of arrow A of FIG. 8 from the back of the housing 1.

Thereupon, the retaining projections 23 engage with the retaining surfaces (upper side edges) 9a of their corresponding peripheral retaining portions 9, while the retaining projections 22 engage with the retaining surfaces 19a of their corresponding peripheral retaining portions 19. At the same time, the terminal fitments 7 come elastically into contact with their corresponding terminal strips 24 of the battery pack 21. Accordingly, the pack 21 is urged upward by the fitments 7. Thus, the battery pack 21 is fitted in the power source receiving recess 11 in a manner such that it is restrained from moving from side to side by the wall portions 13 and 17, and from moving upward by the aforesaid engaging structures.

The moment the battery pack 21 is mounted in this manner, the fixing mechanism 25 operates as follows. When the pack 21 is pushed in the direction of arrow A in a manner such that its under surface is in alignment with the bottom surface of the receiving recess 11, as shown in FIG. 12, the detent projection 5 of the recess 11 projects through the open portion 29 of the pack 21 into the pack. Accordingly, the retaining pawl 26d of the retaining arm section 26c runs onto the projection 5 of the recess 11, so that the bell crank 26 rocks in the direction of arrow C against the urging force of the spring 27. When the battery pack 21 is fully inserted into the receiving recess 11, thereafter, the retaining pawl 26d gets over the detent projection 5. Immediately after this, the crank 26 is rocked in the direction of arrow B by the urging force of the spring 27, so that the pawl 26d is caught by the projection, as indicated in FIG. 11. Thus, the battery pack 21 is fixed in the receiving recess 11, and is prevented from slipping out rearward from the recess 11. This operation of the fixing mechanism 25 can be automatically achieved by only pushing the battery pack 21 into the receiving recess 11, in the direction of arrow A.

The mounting of the battery pack 21 can be completed by the aforementioned one-touch operation, so that the pack 21 can be stably set in the housing 1.

Alternatively, the battery pack 21 may be fitted in the power source receiving recess 11 through onetouch operation such that it is forwardly inserted from the rear side, as indicated by arrow A of FIG. 12, after being fitted into the recess 11 from above, as indicated by arrow D.

The battery pack 21 can be removed from the power source receiving recess 11 by reversely following the aforementioned processes of mounting operation. First, the operator draws out the whole pack 21 rearward while pushing the operating section 26b rearward with the thumb of his or her hand so that the hand is on the top and rear faces of the pack 21, which are exposed on the top face of the rear portion and the rear face, respectively, of the housing 1. Thereupon, the bell crank 26 is rocked counterclockwise, as indicated by the two-dot and dash lines in FIG. 11, by the action of the operating section 26b, resisting the urging force of the spring 27. As a result, the retaining pawl 26d of the retaining arm section 26c is disengaged from the detent projection 5, so that the battery pack 21 is released from the fixation by the fixing mechanism 25. The moment the pack 21 is released in this manner, the whole pack is removed from the power source receiving recess 11 by the aforesaid draw-out operation.

In drawing out the battery pack 21 from the receiving recess 11, the edge portion 29a of the bottom wall is caught by the detent projection 5, as shown in FIG. 12, so that the draw-out operation is temporarily stopped. In this state, the retaining projections 22 and 23 are not in engagement with their corresponding retaining portions 9 and 19. If the operator mistakenly releases his or her hold of the battery pack 21 in the disengaged state, therefore, the pack 21 can be prevented from unexpectedly falling, since the edge portion 29a is caught by the projection 5.

As shown in FIG. 8, a through hole 31 for wiring and a retaining hole 32 continuous therewith are formed at the corner between a front end wall and a bottom wall of the optional part receiving recess 15, on the side of the wall portion 17 which divides the recess 15 and the power source receiving recess 11. Further, a retaining hole 33 is formed at the same corner portion, on the side opposite to the recess 11. Also, a retaining groove 34 extending parallel to the wall portion 17 is formed on the side edge of the bottom wall of the recess 15, on the side opposite to the recess 11. A nut 35 is embedded in that end portion of the rear face of the housing 1 on the side opposite to the recess 11 so that it adjoins the recess 15.

The receiving recess 15 is fitted with a circuit board (not shown) for connection. If necessary, moreover, over, the recess 15 can contain an optional component, such as an interface component (not shown) for communication. An optional cover 36 is removably attached to the recess 15.

As shown in FIGS. 8 and 13, the optional cover 36 includes a top wall having a rectangular plane configuration and a peripheral wall formed along the peripheral edge of the top wall. The width of the top wall is equal to that of the battery pack 21. A pair of retaining projections 37, which can be releasably fitted in the retaining holes 32 and 33 of the receiving recess 15, respectively, protrude integrally from the front wall of the optional cover 36. Also, the front wall of the cover 36 has a notch 36a which corresponds to the through hole 31. A rib (not shown), which is adapted to engage the retaining groove 34, protrudes from the lower end of the side wall surface of the cover 36, on the side opposite to the power source receiving recess 11.

In FIGS. 8 and 13, numeral 40 denotes a knockout portion formed in the rear wall of the optional cover 36, and numeral 41 denotes an engaging projection which projects from the housing 1 into the receiving recess 15 and engages the lower surface of the front edge of the cover 36 as the cover is mounted. Numeral 42 denotes an engaging projection which protrudes from the rear edge of the top wall of the cover 36 and engages the edge of the through hole 31 on the housing side.

The optional cover 36 is fitted into the optional part receiving recess 15 from the back of the housing 1 in the direction of arrow E of FIG. 8. Thereupon, the retaining projections 37 are caused to engage their corresponding retaining holes 32 and 33, and the rib is caused to engage the retaining groove 34. Thus, the optional cover 36 is fitted to the receiving recess 15 5 in a manner such that it is restrained from moving from side to side by the wall portion 17 and the engagement between the rib and the groove 34, and from moving upward by the engagement between the projections 37 and the holes 32 and 33. The cover 36 is fixed to the housing 1 by means of a screw 38 and another screw (not shown) so as to cover the recess 15. The screw, 38 is passed through the rear wall of the cover 36 are engages with the nut 35. Another screw passes through metal fitting 39 (see FIGS. 8 and 13) which is fixed to the cover 36, and engages with the circuit board (not shown).

In this mounted state, the top and rear faces of the optional cover 36 and the lateral face thereof opposite to the battery pack 21 are exposed, as shown in FIGS. 2 to 4, thus constituting part of the outer surface of the rear portion of the housing 1. In the present embodiment, the top and rear face of the cover 36 are arranged flush with the rear half portion 8 of the top face of the housing 1 and the rear face thereof, respectively. The top face of the optional cover 36 is also flush with the top face of the display unit 12 in the closed state. The upper end of the wall portion 17 is covered by those end portions of the pack 21 and the cover 36 which abut against each other.

The optional cover 36 can be removed, as required, from the housing 1 by reversely following the aforementioned processes of mounting operation.

As shown in FIGS. 14 to 19, a tilting mechanism 50 is attached to the central portion of the bottom of the rear end portion of the housing 1.

Figure 17:
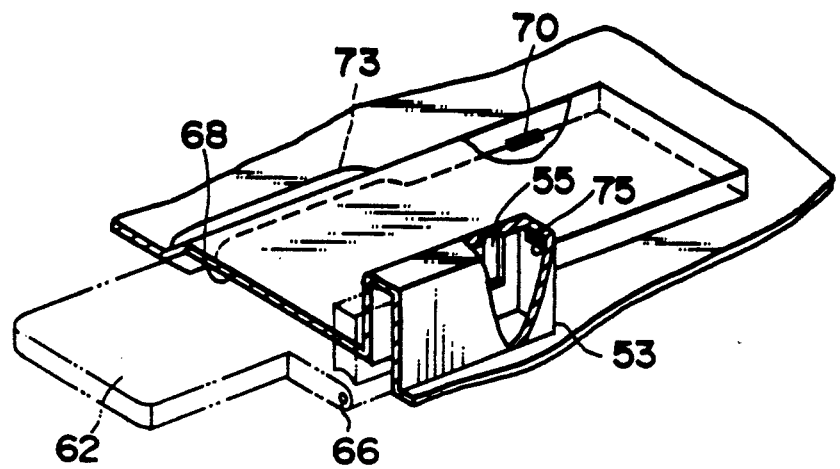
Figure 18:
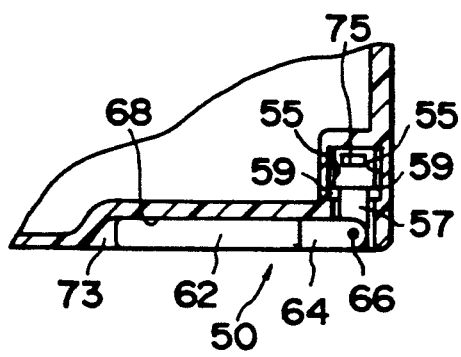
Figure 19:
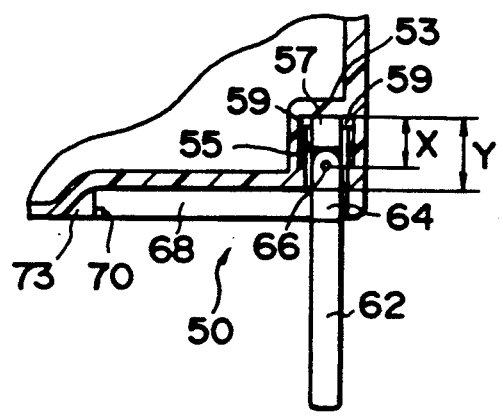

As shown in detail in FIGS. 17 to 19, the tilting mechanism 50 is provided with a holder portion 53 in the form of a thin box in the center of the tail end portion of the housing 1. The portion 53, which has a rectangular cross section elongated in the transverse direction of the housing 1, extends upward from the bottom side of the housing. Only the lower end of the holder portion 53 opens to the bottom face of the housing 1. A slide passage (mentioned later) is defined by the inner surfaces of the holder portion 53. Two guide grooves 55 are formed on each of paired inner surfaces of the portion 53 which extend in the transverse direction of the housing 1. More specifically, each groove 55 vertically extends from the uppermost portion of its corresponding inner surface of the holder portion 53 to the middle portion thereof.

As shown in FIGS. 16 to 19, a slider 57 in the form of a rectangular prism, for use as a stand supporting member, is fitted in the holder portion 53 for vertical sliding motion. Namely, the slider 57 is formed of a plate member having a thickness corresponding to the cross section of the holder portion 53. Projections 59 are formed at the upper end of each lateral face of the slider 57 which faces the guide grooves 55. The projections 59 are adapted to be slidably fitted in their corresponding guide grooves. Thus, the slider 57 can slide in the holder portion 53 or the slide passage, within the range of extension of the guide grooves 55. A boss portion 60 for connection protrudes downward from the center of the lower end of the slider 57 on the bottom side of the housing 1.

Figure 15:
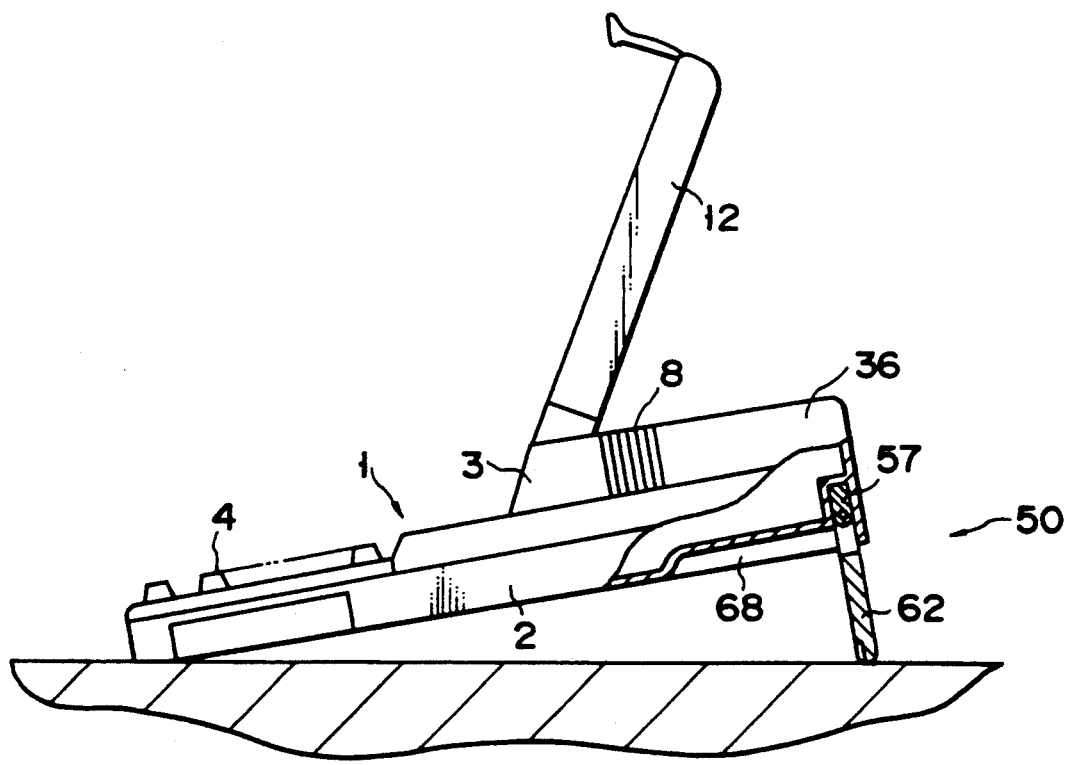
Figure 16:
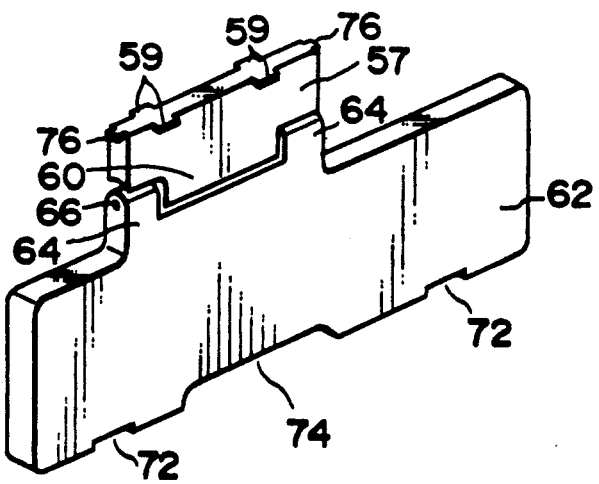

The tilting mechanism 50 includes a stand 62 which is connected to the slider 57. As shown in FIG. 16, the stand 62 is formed of a rectangular plate as thick as or thinner than the slider 57. A pair of boss portions 64 for connection protrude from the center of one side end of the stand 62 so as to be spaced at a predetermined distance and situated on either side of the boss portion 60 of the slider 57. The boss portions 64 are rotatably connected to the boss portion 60 of the slider 57 by means of a shaft 66, which penetrates these boss portions in the transverse direction of the housing 1. Thus, the stand 62 can be rocked in the longitudinal direction of the housing 1, between a housed position shown in FIGS. 14 and 18 and a raised position shown in FIGS. 15 and 19.

A depression 68 for receiving the stand 62 is formed in the bottom face of the housing 1 so as to be situated in front of the holder portion 53. The depression 68 is shaped corresponding to the outer configuration of the stand 62. A bottom opening of the holder portion 53 communicates with the depression 68. Thus, the whole stand 62, including the boss portions 64, can be housed in the depression 68 by being brought down forward around the shaft 66. The depth of the depression 68 is equal to the thickness of the stand 62 so that the bottom face of the housing 1 is flush with the lower surface of the stand 62 when the stand is housed in the depression 68.

As shown in FIGS. 17 and 19, a pair of elastic hooks 70 protrude from the front-side edge of the depression 68. Corresponding to the hooks 70, a pair of engaging recesses 72 are formed at the end portion of the stand 62 on the side opposite to the slider 57. As the hooks 70 are removably engaged with the recesses 72, the stand 62 is prevented from unexpectedly getting out of the depression 68. A hollow 73 for finger access is formed on the front-side edge of the depression 68. Likewise, a hollow 74 for finger access is formed on the outer peripheral portion of the reverse side of the stand 62 which corresponds to the hollow 73. Thus, the stand 62 in the housed state can be raised with ease.

As shown in FIG. 19, the depth Y (distance from open end to bottom) of the holder portion 53 is greater than the distance X from the shaft 66 to the upper end of the slider 57. Thus, the stand 62 can be inserted into the holder portion 53 so that the upper end portions of the boss portions 64 and the shaft 66 are housed in the portion 53. In other words, the upper end portions of the boss portions 64 can be fitted into the holder portion 53 by inserting the stand 62 in the raised position into the portion 53. Thus, the upper end portions of the boss portions 64 are surrounded by the walls of the holder portion 53, so that the stand 62 is restrained from rocking and kept in the raise position. Projections 76 are formed on the top end face of the slider 57, and recesses 75 adapted to be releasably engaged with the projections 76 are formed on the upper end of their corresponding inner surfaces of the holder portion 53, whereby the raised stand 62 is positioned and fixed.

The length of the guide grooves 55 on the inner surfaces of the holder portion 53 is greater than the difference (Y−X) between the dimensions Y and X. By moving the raised stand 62 downward, along with the slider 57, so that the projections 59 of the slider 57 abut against the lower ends of the grooves 55, therefore, the boss portions 64 and the shaft 66 can be drawn out of the holder portion 53, so that the stand 62 can be rocked to the housed position.

Figure 14:
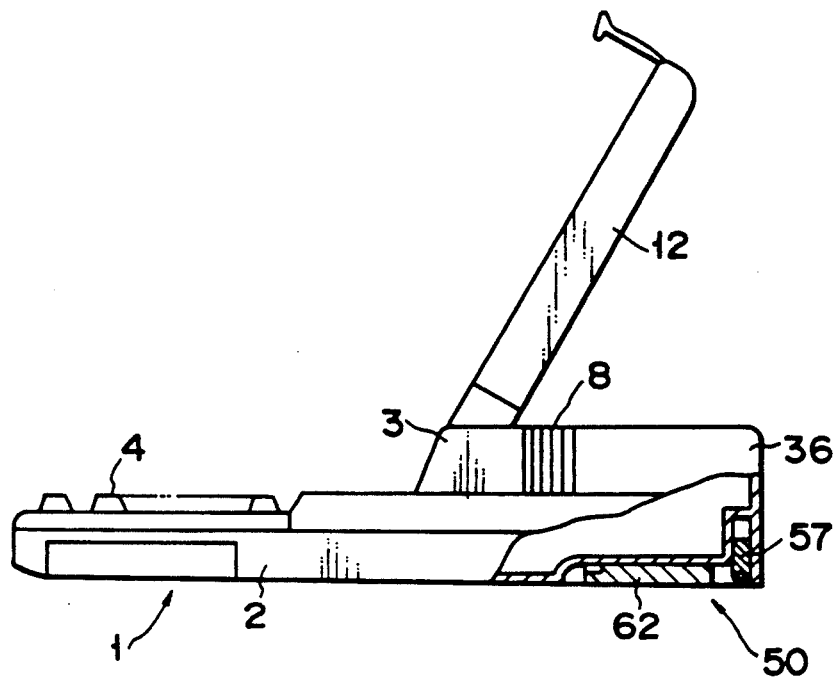

In carrying the personal computer with the tilting mechanism 50 described above, the display unit 12 is closed, and the stand 62 is brought down to the housed position where it is housed in the receiving depression 68, as shown in FIGS. 14 and 18. Thus, the housing 1, display unit 12, and stand 62 are combined into a single rectangular block which is handy to carry.

When using the personal computer on a desk or the like, the housing 1 is placed on the baring surface of the desk, and the display unit 12 is opened, as shown in FIG. 14. In tilting the keyboard 4 for use, the operator lifts the rear portion of the housing 1 in the state shown in FIG. 14 with one of his or her hands, and inserts a finger of the other hand into the hollow 73 at the bottom of the housing. Then, the operator draws out and raises the stand 62 from the depression 68 with the tip of the inserted finger caught by the hollow 74 of the stand.

In this state, the stand 62 is rocked to the rear side until the boss portions 64 abut against the wall portion of the holder portion 53. Then, the stand 62 is urged to be pushed in toward the housing 1 so that the boss portions 64 are inserted into the holder portion 53. Thereupon, the boss portions 64, along with the slider 57, are fitted in the holder portion 53, as shown in FIGS. 15 and 19. As the boss portions 64 are thus located in the holder portion 53, the raised stand 62 is locked and prevented from falling in the longitudinal direction by the wall portion of the holder portion 53. Further, the projections 76 of the slider 57 engage their corresponding recesses 75 of the holder portion 53, whereupon the stand raising operation is completed.

When the housing 1 with the raised stand 62 is placed on the bearing surface of the desk or the like, as shown in FIG. 15, the keyboard 4 is declined forward, thus facilitating its operation.

Constructed in this manner, the personal computer of the present embodiment has the following advantages.

As mentioned before, the mounting portion for the battery pack 21 and the optional component is formed of the power source receiving recess 11 and the optional part receiving recess 15 which open to the top face of the rear portion of the housing 1, i.e., the rear half portion 8, and the rear face of the housing. The battery pack 21 and the optional cover 36 are fitted to the recesses 11 and 15, respectively. The top and rear faces of the pack 21 and the cover 36, mounted separately in the recesses 11 and 15 from behind the housing 1, are exposed on the rear half portion 8 of the top face of the housing and the rear face thereof, respectively, thus constituting part of the outer surface of the housing.

According to the arrangement described above, the housing 1 need not be provided with any partition wall portion for concealing the top of the space for housing the battery pack 21 and the optional component, so that the rear portion of the housing can be reduced in thickness.

The battery pack 21 and the optional cover 36 are mounted on the top side of the rear portion of the housing 1. In contrast with the case in which the battery pack and the optional cover are arranged in front of the keyboard 4, therefore, the keyboard need not be crossed by wires for electrically converting the battery pack and the optional part to the printed board in the housing 1 and thus can be operated without hindrance. If the battery pack 21 and the like are attached to the flank of the housing 1, they overlap the keyboard 4, so that the thickness of the housing 1 increases. To avoid this, a space for storing the pack 21, etc. must be secured beside the keyboard 4, so that the transverse dimension of the housing 1 increases. According to the present embodiment, the battery pack 21 and the optional cover 36 can be attached to the housing 1 without a problem. Thus, the arrangement in which the pack 21 and the cover 36 are located at the rear portion of the housing 1 has a great advantage over other arrangements in being more effective in utilizing the space of the housing and for compact designing of the housing.

As mentioned before, moreover, the battery pack 21 can be mounted into or removed from the power source receiving recess 11 by moving the pack 21 in a direction perpendicular to its longitudinal direction. More specifically, the battery pack 21 is attached to the rear portion of the housing 1 so that its top and rear faces are exposed on the top face of the rear portion of the housing and the rear face thereof, respectively. Thus, the operator can remove the pack 21 rearward from the housing 1 after releasing it from the fixation by the fixing mechanism 25 with his or her hand on the top and rear faces of the pack 21. The direction of the release of the fixation by the fixing mechanism 25, that is, the rocking direction of the operating section 26b of the bell crank 26, is in alignment with the direction in which the battery pack 21 is drawn out from the receiving recess 11. Accordingly, these operations can be continuously performed one-handed, so that the battery pack 21 can be removed with ease. Also in mounting the battery pack 21 into the power source receiving recess 11, the operator can push in the pack 21 forward with his or her hand on the top and rear faces of the pack 21.

Since the operator can mount and remove the battery pack 21 with his or her hand on the exposed top and rear faces thereof, as described above, the operating efficiency can be improved.

During the process of removing the battery pack 21, moreover, the edge portion 29a of its bottom wall is caught by the detent projection 5 of the housing 1, whereby the movement of the pack 21 can be stopped temporarily. Thus, the battery pack 21 can be prevented from being mistakenly dropped while it is being drawn out rearward. After this temporary stop, the operator can reassure his or her hold of the battery pack 21, and then continue the removal thereof. After the edge portion 29a is caught by the detent projection 5, furthermore, the operator can take out the battery pack 21 from the receiving recess by lifting it diagonally upward. In this case, the stroke for the rearward draw-out of the battery pack can be shortened.

The personal computer is provided with the tilting mechanism 50, and the housing 1 can be easily tilted by only rocking the single stand 62 toward the rear side of the housing 1. In the raised position, moreover, the stand 62 is restrained from falling in the longitudinal direction by the wall portion of the holder portion 53, thus ensuring high stability. Since the space to house the stand 62 extends in the direction of the thickness of the housing 1, moreover, the tilting mechanism 50 does not hinder the compact design of the housing 1.

It is to be understood that the present invention is not limited to the embodiment described above, and that various changes and modifications may be effected therein by one skilled in the art without departing from the scope or spirit of the invention.

Naturally, for example, the battery pack 21 and the optional cover 36 may be mounted using various other arrangements without being limited to the above embodiment. Further, the power source receiving recess and the optional part receiving recess may be formed opening to the rear half portion of the top face of the housing and the rear portion of the lateral face thereof.

A plurality of detent projections and a plurality of retaining pawls may be provided on the housing and in the fixing mechanism of the battery pack, respectively. In the embodiment described above, moreover, the stand of the tilting mechanism is designed so that it is raised toward the rear side of the housing. Alternatively, however, the stand may be arranged so that it can be rotated and raised from the housed position toward the front side of the housing. Further, the stand in the receiving depression is retained by means of the elastic hooks (latch type) in the foregoing embodiment. Alternatively, however, the stand may be held in position by means of a spring, for example.

Furthermore, the present invention is not limited to personal computers, and may be applied to various other miniature electronic apparatuses, such as word processors.

What is claimed is:

1. A portable computer comprising:
a housing substantially in the form of a rectangular prism, having a top face, a peripheral surface continuous with the top face, and a receiving recess opening to the top face and the peripheral surface;
an optional component having substantially the same shape as the receiving recess and removably fitted in the receiving recess, the optional component having an outer surface constituting par of the top face of the housing and part of the peripheral surface of the housing when the optional component is fitted in the receiving recess; and
means for retaining the optional component in the receiving recess, said retaining means including first engaging means provided in the receiving recess of the housing, second engaging means, provided in the optional component, for engaging the first engaging means when the optional component is fitted in the receiving recess and for disengaging from the first engaging means when the optional component is moved in a direction substantially parallel to the top face of the housing, and lock means for locking the optional component in the receiving recess so that the first engaging means and the second engaging means are in engagement with each other, the lock means having a detent projection projecting vertically in the receiving recess from a bottom of the receiving recess, and the optional component comprising a retaining member, provided at a bottom of the optional component, for engaging the detent projection when the optional component is fitted in the receiving recess;
the optional component including an opening for receiving the detent projection when the optional component is fitted in the receiving recess, and a stopper portion, defining part of the opening, for abutting against the detent projection to substantially stop movement of the optional component when the second engaging means is disengaged from the first engaging means while the optional component is moved in the direction substantially parallel to the top face of the housing.

2. A portable computer according to claim 1, wherein the receiving recess and the optional component are substantially in the form of a rectangular prism, the optional component having a top face and one lateral face constituting part of the top face of the housing and the part of the peripheral surface, respectively, when the optional component is fitted in the receiving recess.

3. A portable computer according to claim 2, wherein the retaining member comprises a retaining arm section, extending along the bottom surface of the optional component and capable of engaging the detent projection, and an operating arm section extending from the retaining arm section to the top face of the optional component along the one lateral face of the optional component, the retaining arm section being attached to the optional component to be rotatable between a lock position where the retaining arm section is engaged with the detent projection and a release position where the retaining arm section is disengaged from the detent projection, the operating arm section being adapted to rotate the retaining arm section to the release position when externally pressed in a predetermined direction, and the lock means including means for urging the retaining member to the lock position.

4. A portable computer according to claim 3, wherein the retaining arm section is arranged in the opening of the optional component.

5. A portable computer according to claim 4, wherein the predetermined direction in which the operating arm section is pressed is substantially equivalent to the direction substantially parallel to the top face of the housing that the optional component is moved.

6. A portable computer comprising:
a housing substantially in the form of a rectangular prism including a front portion having a keyboard, a rear portion having a rear top surface and a rear side surface continuous with the rear top surface, and a display connecting portion located between the front portion and the rear portion, the rear portion having a first receiving recess for receiving an optional device other than a second battery pack, the first receiving recess and the second receiving recess being open to the rear top surface and the rear side surface, the battery pack having a first upper surface and a first rear surface which are substantially flush with the rear top surface and the rear side surface of the housing, respectively, when the battery pack is fitted in the first receiving recess;
a display unit connected to the display connecting portion and rotatable between a closed position for covering the keyboard and an open position for operating the keyboard; and
a cover removably attached to the rear portion for covering the second receiving recess, the cover having a second upper surface and a second rear surface which are substantially flush with the rear top surface and the rear side surface of the housing, respectively.

7. A computer according to claim 6, wherein the display unit includes an inner cover facing to the front portion of the housing when the display unit is in the closed position and an outer cover being substantially flush with the rear top surface when the display unit is in the closed position.

8. A computer according to claim 6, wherein the first receiving recess has a first longitudinal axis parallel to the rear side surface, and the battery pack has a second longitudinal axis which is parallel with the first longitudinal axis when the battery pack is fitted in the first receiving recess.

9. A computer according to claim 8, wherein the second receiving recess has a third longitudinal axis parallel to the rear side surface, and the cover has a fourth longitudinal axis which is parallel to the third longitudinal axis when the cover is attached to the second receiving recess.

10. A computer according to claim 6, wherein the first and the second receiving recesses are proximate to each other.

11. A computer according t claim 6, wherein the first receiving recess includes a first bottom surface, a pair of first side walls, and a firs front wall having a pair of holes, and the battery pack includes a second front wall having a pair of projections for engaging the holes, respectively, when the battery pack is stored in the first receiving recess.

12. A computer according to claim 11, wherein the first front wall is closer to the display mounting portion than are the first side walls and the first bottom surface.

13. A computer according to claim 11, wherein the second receiving recess includes a second bottom surface, a pair of second side walls, and a third front wall which is closer to the display mounting portion than are the second side walls and the second bottom surface.

14. A portable computer according to claim 6, wherein the housing and the battery pack are provided with means for retaining the battery pack in the first receiving recess, said retaining means including first engaging means provided in the first receiving recess of the housing, second engaging means provided in the battery pack and adapted to engage the first engaging means, and means for locking the first engaging means and the second engaging means in engagement with each other.

15. A portable computer according to claim 14, wherein the second engaging means is adapted to one of engage with and disengage from the first engaging means as the battery pack is moved substantially parallel to the rear top surface of the housing.

* * * * *

UNITED STATES PATENT AND TRADEMARK OFFICE
CERTIFICATE OF CORRECTION

PATENT NO. : 5,200,883
DATED : April 6, 1993
INVENTOR(S) : KOBAYASHI, Takaichi

It is certified that error appears in the above-indentified patent and that said Letters Patent is hereby corrected as shown below:

Column 13, line 14, Thereof:

Reads: "par"

Should Read: --part--

Column 14, line 20, Thereof:

Reads: "recess for"

Should Read: --recess for receiving a battery pack and a second receiving recess for--

Signed and Sealed this

Sixteenth Day of May, 1995

Attest:

BRUCE LEHMAN

Attesting Officer     Commissioner of Patents and Trademarks